US008551609B2

(12) United States Patent
Lu et al.

(10) Patent No.: US 8,551,609 B2
(45) Date of Patent: Oct. 8, 2013

(54) METHOD OF DEPOSITING NIOBIUM DOPED TITANIA FILM ON A SUBSTRATE AND THE COATED SUBSTRATE MADE THEREBY

(75) Inventors: Songwei Lu, Wexford, PA (US); James W. McCamy, Export, PA (US); James J. Finley, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 514 days.

(21) Appl. No.: 12/767,910

(22) Filed: Apr. 27, 2010

(65) Prior Publication Data
US 2011/0262757 A1    Oct. 27, 2011

(51) Int. Cl.
*C03C 17/34* (2006.01)

(52) U.S. Cl.
CPC .................... *C03C 17/3417* (2013.01)
USPC ........... 428/220; 428/426; 428/432; 428/697; 428/699; 428/702

(58) Field of Classification Search
None
See application file for complete search history.

(56) References Cited

U.S. PATENT DOCUMENTS

| | | | |
|---|---|---|---|
| 3,333,936 A | 8/1967 | Warren | |
| 3,660,061 A | 5/1972 | Donley et al. | |
| 4,111,150 A | 9/1978 | Donley et al. | |
| 4,187,336 A | 2/1980 | Gordon | |
| 4,402,722 A | 9/1983 | Edge | |
| 4,719,126 A | 1/1988 | Henery | |
| 4,719,127 A | 1/1988 | Greenberg | |
| 4,853,257 A | 8/1989 | Henery | |
| 5,356,718 A | 10/1994 | Athey et al. | |
| 5,616,173 A * | 4/1997 | Okamoto et al. | 106/1.19 |
| 5,776,236 A | 7/1998 | Neuman et al. | |
| 5,863,337 A | 1/1999 | Neuman et al. | |
| 6,656,523 B2 | 12/2003 | Russo et al. | |
| 6,761,984 B2 * | 7/2004 | Anzaki et al. | 428/697 |
| 7,049,002 B2 | 5/2006 | Greenberg et al. | |
| 7,413,767 B2 | 8/2008 | Bauch et al. | |

(Continued)

FOREIGN PATENT DOCUMENTS

AU    758267 B2    5/2000
EP    1 796 107 A1    6/2007

(Continued)

OTHER PUBLICATIONS

"Four Point Probe Theory," downloaded from http://www.four-point-probes.com/fpp.html, 2009, no author available.*

(Continued)

*Primary Examiner* — David Sample
(74) *Attorney, Agent, or Firm* — Andrew C. Siminerio

(57) ABSTRACT

A coated article includes a pyrolytic applied transparent electrically conductive oxide film of niobium doped titanium oxide. The article can be made by using a coating mixture having a niobium precursor and a titanium precursor. The coating mixture is directed toward a heated substrate to decompose the coating mixture and to deposit a transparent electrically conductive niobium doped titanium oxide film on the surface of the heated substrate. In one embodiment of the invention, the method is practiced using a vaporized coating mixture including a vaporized niobium precursor; a vaporized titanium precursor, and a carrier gas to deposit a niobium doped titanium oxide film having a sheet resistance greater than 1.2 and an index of refraction of 2.3 or greater. The chemical formula for the niobium doped titanium oxide is $Nb:TiO_X$ where X is in the range of 1.8-2.1.

12 Claims, 4 Drawing Sheets

(56) References Cited

U.S. PATENT DOCUMENTS

| | | | |
|---|---|---|---|
| 7,431,992 B2 | 10/2008 | Kutilek et al. | |
| 2003/0165694 A1* | 9/2003 | Hartig et al. | 428/428 |
| 2007/0218646 A1 | 9/2007 | Hitosugi et al. | |
| 2009/0126791 A1* | 5/2009 | Lu et al. | 136/258 |
| 2009/0186213 A1* | 7/2009 | Ihlo et al. | 428/336 |
| 2010/0075176 A1* | 3/2010 | Yamada et al. | 428/697 |
| 2012/0024192 A1* | 2/2012 | Takami et al. | 106/286.4 |

FOREIGN PATENT DOCUMENTS

| | | | |
|---|---|---|---|
| EP | 2 128 876 A1 | | 12/2009 |
| JP | 2001-058871 | * | 3/2001 |
| JP | 2007-329109 | * | 12/2007 |
| WO | 98/11031 A1 | | 3/1998 |
| WO | 2008044474 A1 | | 4/2008 |
| WO | 2009057606 A1 | | 5/2009 |

OTHER PUBLICATIONS

U.S. Appl. No. 09/434,823, filed Nov. 5, 1999, George A. Neuman.

U.S. Appl. No. 12/572,317, filed Oct. 2, 2009, James W. McCamy et al.

Hitosugi, T. et al: "Fabrication of TiO2-Based Transparent Conducting Oxide Films on Glass by Pulsed Laser Deposition", Japanese Journal of Applied Physics, Japan Society of Applied Physics, JP, vol. 46, No. 3, Dec. 1, 2007, pp. L86-L88.

PCT Search Report, PCT/US2011/032645, dated Dec. 13, 2011.

* cited by examiner

# METHOD OF DEPOSITING NIOBIUM DOPED TITANIA FILM ON A SUBSTRATE AND THE COATED SUBSTRATE MADE THEREBY

BACKGROUND OF THE INVENTION

1. Field of the Invention

This invention relates to a method of depositing a transparent electrically conductive niobium doped titania film on a substrate and the coated substrate made thereby, and more particularly, to applying the niobium doped titania film on glass substrates by a pyrolytic coating process, e.g. a chemical vapor deposition process, to provide a coated substrate that can be used, in the manufacture of, but not limited to, photovoltaic devices, electrodes for electro chromic-devices, electrically heatable vision panels for refrigerators and aircraft windows, organic light emitting diodes and low emissivity coatings for residential and commercial windows.

2. Discussion of the Presently Available Technology

Substrates, e.g. but not limited to, glass sheets having a transparent electrically conductive oxide film deposited on a surface are used in the manufacture of, but not limited to, thin film photovoltaic applications, electrical touch panels, electrodes for electro-chromic devices, organic light emitting diodes, electrically heated glass for anti-fog commercial refrigerator doors and for aircraft transparencies, and low emissivity coatings for residential and commercial windows, e.g. infra-red reflective windows. Of particular interest in the present discussion are transparent electrically conductive oxide films deposited by the chemical vapor deposition coating process usually referred to in the art as the CVD process, e.g. but not limited to the CVD processes disclosed in U.S. Pat. Nos. 4,853,257; 5,356,718 and 7,413,767. The most common transparent electrically conductive oxide film deposited on glass by the CVD process is a tin oxide film usually doped with fluorine.

Although fluorine doped tin oxide films are acceptable for making transparent electrically conductive and infra-red reflective coatings, it can be appreciated by those skilled in the art that having additional transparent electrically conductive oxide films or coatings available reduces the usage of tin and provides a more competitive market for purchases of material for use in the manufacture of transparent conductive oxide films by the CVD coating process.

SUMMARY OF THE INVENTION

This invention relates to an improved coated article of the type having a pyrolytic deposited transparent electrically conductive oxide film over a surface of a substrate, the improvement includes, among other things, the pyrolytic deposited transparent electrically conductive oxide film is niobium doped titanium oxide.

The invention further relates to a vaporized coating mixture for a pyrolytic coating process, the coating mixture includes, among other things, a vaporized niobium precursor; a vaporized titanium precursor, and a carrier gas.

The invention still further relates to an improved method of applying a transparent electrically conductive oxide film over a surface of a substrate, the method that is improved by the invention includes, among other things, directing a coating mixture toward the surface of a heated substrate to pyrolytically deposit a coating over a surface of the substrate, the improvement includes, among other things, providing a coating mixture having a niobium precursor and a titanium precursor; directing a stream of the coating mixture toward a heated substrate to vaporize the coating mixture and to deposit a transparent electrically conductive niobium doped titanium oxide film on the surface of the heated substrate, and moving the stream of the coating mixture and the substrate relative to one another.

DETAILED DESCRIPTION OF THE INVENTION

Figure 1:
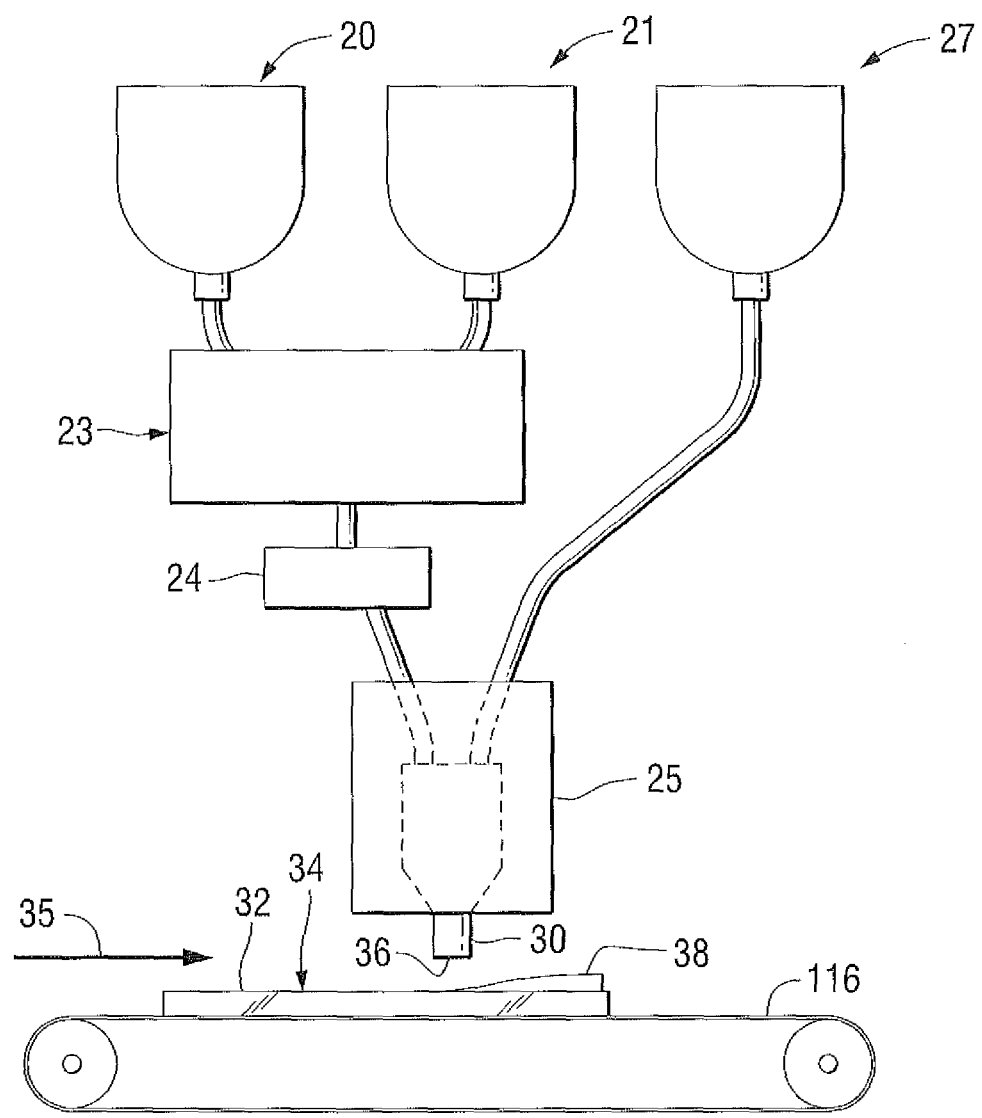
FIG. 1 is a side elevated view of a coating apparatus used in the practice of the invention to apply or deposit a niobium doped titania film on a substrate.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about." Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the term "moved over" "coated over", "applied over" and "positioned over" means moved, coated and positioned on but not necessarily in surface contact with. For example, a first film "coated over" a surface does not preclude the presence of a second film between the surface and the first film.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

In the practice of the invention, a pyrolytic coating process is practiced to deposit a film of titania ("$TiO_2$") doped with niobium ("Nb") (also referred to as a "$TiO_2$:Nb film") over, or on, e.g. in surface contact with, a surface of a substrate. The $TiO_2$:Nb film is conductive and has an index of refraction of about 2.3; the index of refraction of the coated article measured using an ellipsometer. As can now be appreciated, the invention is not limited to the stoichiometry of the formula $TiO_2$:Nb, e.g. the value of oxygen can be greater than or less than 2, e.g. but not limited to the range of 1.8-2.1.

In the non-limiting embodiments of the invention discussed below, the pyrolytic coating process is a chemical vapor deposition coating process known in the art as the "CVD" coating process e.g. but not limited to the CVD coating process disclosed in U.S. Pat. No. 5,356,718, which patent is hereby incorporated by reference. As is appreciated, the invention is not limited to any particular pyrolytic coating process, and any of the pyrolytic coating processes known in the art, e.g. but not limited to, atmospheric plasma deposition, spray pyrolysis or plasma energy coating vapor deposition can be used in the practice of the invention. Suitable spray pyrolysis methods and apparatuses are described in U.S. Pat. Nos. 3,660,061; 4,111,150; 4,719,126 and 4,719,127, which patents are hereby incorporated by reference.

The substrate can be made of any material that has a melting temperature above the higher of the vaporizing or decomposing temperature of the coating precursors. Substrates that can be used in the practice of the invention include, but are not limited to, to clear or colored glass and metal. Further, the substrate can have any shape, e.g. but not limited to bottles, flat substrates, curved substrates, circular shaped substrates, polygon shaped substrates.

Non-limiting embodiments of the invention include, but are not limited to, a $TiO_2$:Nb film over, or in surface contact with, a surface of a glass substrate; a $TiO_2$:Nb film over, or in surface contact with an anti-iridescence, or color suppression layer including one or more coating films over, or in surface contact with, a surface of a glass substrate; a $TiO_2$:Nb film over, or in surface contact with, a layer of one or more transparent, translucent, opaque, coating films or combinations thereof, and a $TiO_2$:Nb film in surface contact with a sodium barrier over, or in surface contact with a surface of a glass substrate. As can be appreciate the $TiO_2$:Nb film of the invention can be under the anti-iridescence, or color suppression layer; under the layer of one or more transparent, translucent, opaque, coating films or combinations thereof; and under the sodium barrier. Further the $TiO_2$:Nb film of the invention can be under or over a film having an index of refraction value greater or less than the index of refraction value of the $TiO_2$:Nb film of the invention. Products that can be made with the coated glass substrate of the invention include, but are not limited to, coated glass for infra-red reflecting windows, thin film photovoltaic applications, electrical touch panels, electrodes for electro-chromic articles, organic light emitting diodes and electrically heated glass for anti-fog commercial refrigerator doors and for aircraft transparencies.

An experiment was conducted to deposit a conductive $TiO_2$:Nb film on a glass substrate using a pyrolytic process, e.g. a CVD coating process. More particularly and with reference to FIG. 1, non-limiting embodiments of the invention were practiced to coat heated flat glass sheets using a niobium precursor of niobium ethoxide ($Nb(C_2H_5O)_5$) (hereinafter also referred to as "NbE") and a titanium precursor of titanium tetraisopropoxide ($Ti[OCH(CH_3)_2]_4$) (hereinafter also referred to as "TPT"). The liquid NbE from NbE supply 20 and the liquid TPT from TPT supply 21 were continuously added to mixer 23. The NbE and TPT mixture was moved from the mixer 23 into a vaporizer 24 heated to a temperature of 300° Fahrenheit ("F") (149° Centigrade ("C")) to vaporize the NbE and TPT mixture. The vaporized NbE and TPT mixture was moved from the vaporizer 24 to a chamber 25 heated to a temperature of 300° F. (149° C.) and was mixed with nitrogen gas moved from supply 27 to the chamber 25. The vaporized mixture of NbE, TPT, and nitrogen gas was moved out of the chamber 25 to, and through, a coating nozzle 30 toward a surface 32 of a glass sheet 34 heated to a temperature of about 115° F. (521° C.) and moving in the direction of arrow 35 under opening 36 of the coating nozzle 30 to deposit or apply a $TiO_2$:Nb film 38 on the surface 32 of the glass sheet 34.

The glass sheets had a length of 12 to 36 inches (30.5 to 91.4 centimeters ("cm")) and a width of 12 inches (30.5 cm) and were moved at a at a rate of 5 inches per minute (12.7 cm per minute). The opening 36 of the coating nozzle 30 was an elongated opening having a width of ¹⁄₁₆ to ⅛ inches (0.16 0.32 cm) and a length of 12 inches (30.5 cm). The NbE liquid precursor was moved at a rate of 0 to 8 milliters per hour ("ml/h"), into the mixer 23, and the TPT liquid precursor was moved at a rate of 24-28 ml/h, into the mixer 23. The Table below provides the specific flow rates of the NbE liquid precursor and the TPT liquid precursor for coating runs 1-8.

TABLE

| | Flow Rate (ml/h) | |
| --- | --- | --- |
| Coating Run | TPT liquid precursor | NbE liquid precursor |
| 1 | 28 | 0 |
| 2 | 24 | 2 |
| 3 | 24 | 4 |
| 4 | 24 | 6 |
| 5 | 25 | 0 |
| 6 | 25 | 2 |
| 7 | 25 | 4 |
| 8 | 25 | 6 |

The NbE liquid precursor had a zero flow rate for coating Runs 1 and 5 to establish the $TiO_2$ baseline or control. More particularly, the $TiO_2$ film is electrically non-conductive, therefore, if the coatings of the samples of the Runs 2 to 4, and the Runs 6 to 8, are electrically conductive, an electrically conductive $TiO_2$:Nb film can be deposited by a pyrolytic process, e.g. a CVD coating process.

The NbE and TPT liquid mixture was moved out of the mixer 23 into the vaporizer 24 at a flow rate of 12 ml/h. The nitrogen and the vaporized mixture of NbE and TPT were moved into the chamber 25 at a rate of 35 standard liters per minute ("slm"). The mixed coating vapor of NbE, TPT and N2 was moved out of the coating nozzle opening 36 toward the surface 32 of the glass sheet 34 at a rate of 35 slm.

The Nb:$TiO_2$ film 38 deposited on the surface 32 of the glass sheet 34 had a thickness of ~200 nm to 2 um thick. The film 38 had varying colors, which is characteristic of a film having non-uniform thickness. In a few areas of the film 38 of the Runs 2-4 and 6-8, the sheet resistance was 1.2 to 3.2 ohms/square, and in other areas of the film, the sheet resistance was higher.

As can now be appreciated, the above work demonstrates that a Nb:$TiO_2$ film can be applied by a pyrolytic coating process, e.g. the CVD coating process, to the surface of a heated substrate, e.g. to the surface 32 of the glass sheet 34. Another feature of the pyrolytically deposited Nb:TiO$_2$ film is that it has a an index of refraction higher than the index of refraction of the fluorine doped tin oxide film, e.g. the index of refraction of the Nb:TiO$_2$ film is 2.3, whereas the index of refraction of the fluorine doped tin oxide is 2.00.

As can be appreciated, the invention is not limited to the niobium precursor or the titanium precursor, and any available niobium and/or titanium precursors in either liquid or gaseous form at room temperature can be used in the practice of the invention to provide the mixed vaporized coating of niobium and titanium precursors and a carrier gas for use in a CVD coating process, or a mixed liquid coating of niobium and titanium precursors for use in a pyrolytic spray coating process, to apply or deposit the niobium doped titania transparent conductive oxide film of the invention to a surface of a substrate, e.g. but not limiting to the invention to the surface 32 of the glass sheet 34. Niobium precursors that can be used in the practice of the invention, include but are not limited to, niobium ethoxide, niobium V n-butoxide, tetrakis(2,2,6,6-tetramethyl-3,5-heptanedionato)niobium(IV) and niobium 2-ethylhexanoate. Titanium precursors that can be used in the practice of the invention, include, but are not limited to titanium tetraisopropoxide (TPT), titanium tetrachloride, titanium(IV) ethoxide, titanium(IV) n-butoxide, titanium(IV) methoxide, tetrakis(diethylamino) titanium, titanium(IV) t-butoxide and titanium(IV) bis(ethyl acetoacetato)diisopropoxide. Further, the invention is not limited to the carrier gas, and any carrier gas known in the art for use with liquid and vapor precursors and is in the gaseous state at the temperature inside the chamber 25 can be used in the practice of the invention and include, but are not limited to nitrogen, helium, argon xenon, air, oxygen and combinations thereof.

Further, as can be appreciated, the invention is not limited to the temperature of the vaporized mixed precursors and carrier gas as they move into the chamber 25, and to the temperature of the vaporized coating, e.g. the vaporized precursors and carrier gas, as it exits the opening 36 of the coating nozzle 30; however, in the practice of the invention, it is preferred that the temperature of the vaporized coating is sufficiently high to have the coating in the vapor state, but is below the decomposition temperature of the precursors.

The invention is not limited to the flow rate of the liquid niobium precursor, and of the liquid titanium precursor moving into the mixer 23 (see FIG. 1) and the flow rates of the liquid niobium precursor, and of the liquid titanium precursor can be the same or different. However, varying the flow rate of the liquid precursors as they move into the mixer 23, will vary the ratio of niobium to titania in the coated film 38. For example and not limiting to the discussion, having a higher flow rate for the liquid niobium precursor than the liquid titanium precursor increases the amount of niobium in the film, and having a higher flow rate for the liquid titanium precursor than the liquid niobium precursor increases the amount of titania in the film.

Increasing the flow rate of the vaporized coating out of the nozzle 30 while keeping the speed of the glass sheet 34 constant, or decreasing the speed of the glass sheet while keeping the flow rate of the vaporized coating out of nozzle 30 constant, increases the thickness of the film 38. Decreasing the flow rate of the vaporized coating out of the nozzle 30 while keeping the substrate speed constant, or increasing the substrate speed while keeping the flow rate of the vaporized coating out of the nozzle constant, decreases the thickness of the film 38. As can now be appreciated, adjusting the glass sheet speed and/or the flow rate of the vaporized coating out of the coating nozzle 30 can be used to obtain a TiO$_2$:Nb film of a desired thickness and desired ratio of titanium to niobium.

The invention is not limited to the configuration of the opening 36 of the nozzle 30, and the nozzle opening 36 can have an elongated shape, a circular shape, or a polygon shape, and the size of the opening 36 of the coating nozzle 30 can have any dimension. As is appreciated by those skilled in the art of pyrolytic coating processes, e.g. the CVD coating process the nozzle configuration and size of the nozzle opening is selected to deposit a TiO$_2$:Nb film on a flat or contoured surface of a heated substrate, e.g. a glass sheet 34.

Figure 2:
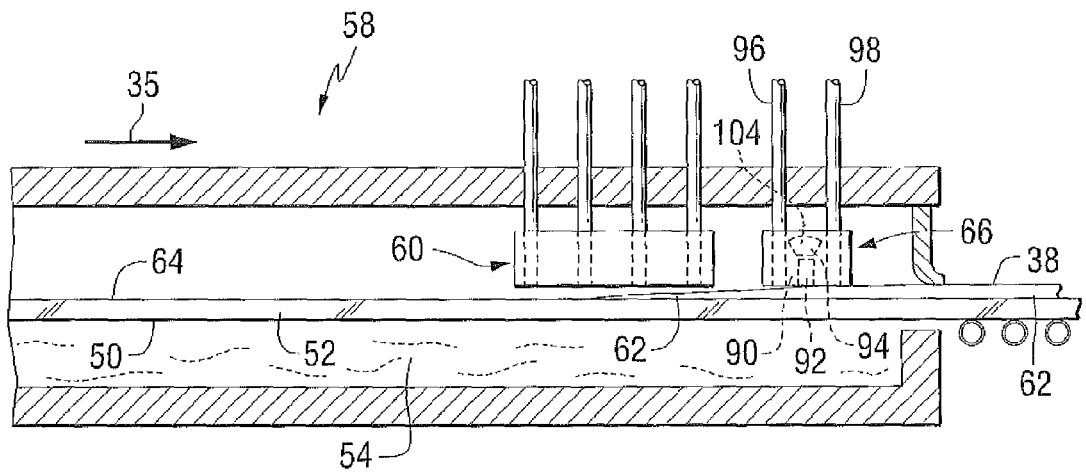
FIG. 2 is a partial cross sectional side view of a glass forming chamber having chemical vapor deposition equipment that can be used in the practice of the invention to apply or deposit a niobium doped titania film on a substrate.
Figure 3:
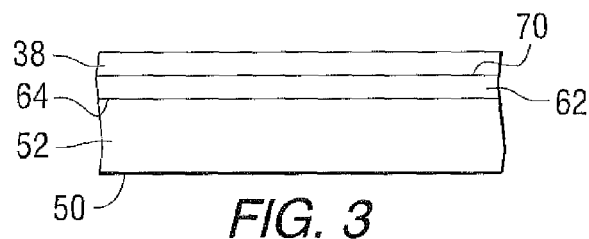
FIGS. 3-5 are side elevated partial views of coated glasses having, among other things, a niobium doped titania film applied or deposited in accordance to the invention.

The discussion is now directed to practicing the invention to apply the TiO$_2$:Nb transparent electrically conductive oxide film of the invention over, or in surface contact with, a surface of a continuous glass ribbon. With reference to FIG. 2, in one non-limiting embodiment of the invention, surface 50 of a continuous glass ribbon 52 floats on a pool 54 of molten metal and moves in the direction of arrow 35. The pool 54 of molten metal is contained in a glass-forming chamber 58, e.g. but not limited to the type disclosed in U.S. Pat. Nos. 3,333,936 and 4,402,722, which patents are hereby incorporated by reference. As the glass ribbon 52 moves under CVD coater 60, e.g. first CVD coater, an anti-iridescence, or color suppression film 62 is applied to surface 64 of the glass ribbon 52, e.g. in surface contact with the surface 64 as shown in FIG. 3. Continued movement of the glass ribbon 52 in the direction of arrow 35 moves the glass ribbon 52 under CVD coater 66, e.g. second CVD coater to apply the TiO2:Nb film 38 of the invention (see FIG. 2) onto surface 70 of the film 62.

The anti-iridescence, or color suppression film 62 is not limiting to the invention and can be a gradient layer of mixed metal oxides having different index of refraction, e.g. but not limited to the type disclosed in U.S. Pat. Nos. 5,356,718 and 5,863,337, which patents are hereby incorporated by reference. In general, the percent of one metal oxide in the anti-iridescence or color suppression film 62 decreases as the distance from the surface 64 of the glass ribbon 52 increases to provide a gradient anti-iridescence film 62 having 100% of the metal oxide having a lower index of refraction, e.g. silicon oxide at the surface 64 of the glass ribbon 52, and 100% of the metal oxide having the higher index of refraction, e.g. tin oxide at the surface 70 of the anti-iridescence film 62 (see FIG. 3). For a detailed discussion of the chemistry and application of an anti-iridescence film references can be made to U.S. Pat. Nos. 5,356,718, 5,863,337 and 7,431,992 B2, which patents are hereby incorporated by reference.

Figure 4:
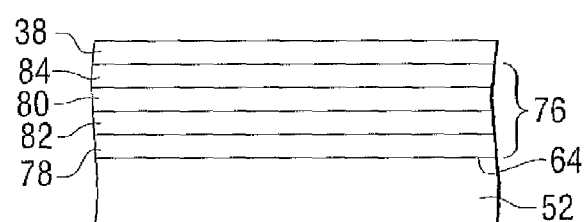

The invention further contemplates an anti-iridescence or color suppression layer having two or more homogeneous layers of metal oxides, e.g. silicon oxide and tin oxide having different index of refraction. More particularly and not limiting to the invention, shown in FIG. 4 is an anti-iridescence or color suppression layer 76 having films of metal oxide 78 and 80 having the lower index of refraction alternating with films 82 and 84 of the metal oxide having the higher index of refraction. For a detailed discussion of anti-iridescence layers having a plurality of homogeneous layers of different metal oxides reference can be made to U.S. patent application Ser. No. 09/434,823 filed Nov. 5, 1999 and Australian Patent No. 758,267, which patent application and patent are hereby incorporated by reference.

Figure 5:
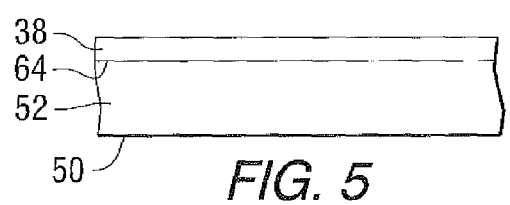

Optionally, the anti-iridescence film 62 and the anti-iridescence layer 76 can be omitted, and the Nb:TiO$_2$ film 68 can be applied directly to the surface 64 of the glass ribbon 52 as shown in FIG. 5. In a non-limiting embodiment of the invention, the layer 62 is a sodium barrier, for example and not limiting to the discussion a homogenous, or non-homogenous or gradient layer of oxides of aluminum and silicon. In another embodiment of the invention, a film having an index of refraction less than the index of refraction is applied under or over the Nb:TiO$_2$ film 68, in still another non-limiting embodiment of the invention, a film having an index of refraction higher than the index of refraction of the Nb:TiO$_2$ film is applied over or under the Nb:TiO$_2$ film.

With reference to FIG. 2, the CVD coating apparatus 60 for applying the gradient anti-iridescence, color suppression or sodium barrier film 62 (see FIG. 3), or multi-layer non-gradient anti-iridescence, color suppression, or sodium barrier layer 76 (see FIG. 4) is not limiting to the invention and any type of CVD coating apparatus known in the art, e.g. but not limiting to the invention, the coating apparatus disclosed in U.S. patent application Ser. No. 12/572,317 filed on Oct. 2, 2009 in the names of James W. McCamy and John F. Sopko and titled NON-ORTHOGONAL COATER GEOMETRY FOR IMPROVED COATINGS ON A SUBSTRATE can be used in the practice of the invention to deposit the film 62 (see FIG. 3) and the layer 76 (see FIG. 4). The disclosure of U.S. patent application Ser. No. 12/572,317 filed on Oct. 2, 2009 is hereby incorporated by reference.

Figure 6:
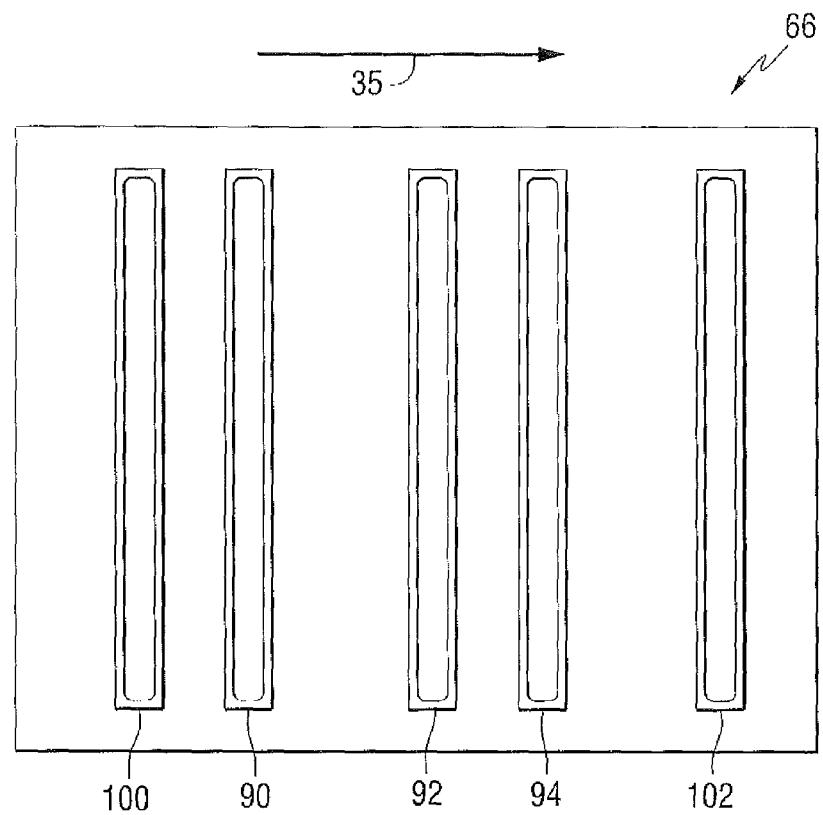
FIG. 6 is a plan view of a coating side of a coater that can be used in the practice of the invention.

The CVD coating apparatus 66 for depositing the TiO$_2$:Nb film is not limiting to the invention and any type of CVD coating apparatus known in the art for applying a transparent electrically conductive oxide film over, or in surface contact with, a surface of a substrate, e.g. as disclosed in U.S. patent application Ser. No. 12/572,317 filed on Oct. 2, 2009, can be used in the practice of the invention. With reference to FIGS. 2 and 6 as needed, in one non-limiting embodiment of the invention, the coating apparatus 68 for applying the TiO$_2$:Nb film to, or over, the surface 64 of the glass ribbon 52 moving in the direction of the arrow 35 includes exhaust slot 90 upstream of coating nozzle 92, and exhaust slot 94 downstream of the coating nozzle 92. The effluent stream from the exhaust slots 90 and 94 are moved through conduits 96 and 98 (see FIG. 2), to a disposal area and processed in accordance with local, state and federal environmental regulations. The coating apparatus 66 further includes a gas curtain nozzle 100 upstream of the upstream exhaust slot 90, and a gas curtain nozzle 102 downstream of the downstream exhaust slot 94. An inert gas, e.g. nitrogen is moved through the gas curtain nozzles 100 and 102 to provide an inert gas barrier or curtain to prevent or limit the movement of the coating vapors or gases from the coating nozzle 92 from moving into the atmosphere of the glass-forming chamber 58, and to prevent or limit movement of the atmosphere of the glass-forming chamber into the space between the coater 66 and the surface 64 of the glass ribbon 52.

In one non-limiting embodiment of the invention, as the glass ribbon 52 moves under the coater 60, the anti-iridescence film 62 or the anti-iridescence layer 76 (see FIGS. 3 and 4) is applied on the surface 64 of the glass ribbon 52. As the glass ribbon 52 moves under the coater 66, the vaporized coating mixture including vaporized niobium precursor, vaporized titania precursor and nitrogen in chamber 104 of the coater 66 moves through the coating nozzle 92 to apply or deposit the TiO$_2$:Nb film 68 over the anti-iridescence film 52 or the anti-iridescence layer 76 as discussed above. The coating vapors, the reaction vapors and gases are removed from the coating area of the coating nozzle 92 by the exhaust slots 90 and 94 (see FIG. 5).

In another non-limiting embodiment of the invention, the coater 60 for applying the anti-iridescence film 62 or the anti-iridescence layer 76 is shut down, and the glass ribbon 52 moves under the coater 66 to apply the TiO$_2$:Nb film on the surface 64 of the glass substrate (FIG. 5) as discussed above.

Figure 7:
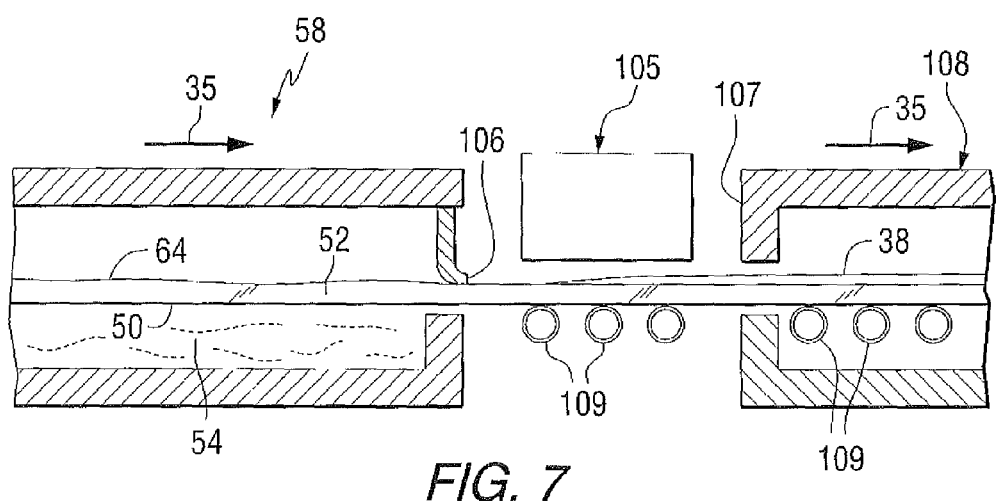
FIG. 7 is a partial cross sectional side view of a glass forming chamber and an annealing furnace with a pyrolytic coater between the exit end of the forming chamber and the entrance end of the annealing furnace; the arrangement can be used in the practice of the invention to apply or deposit a niobium doped titania film on a substrate.
Figure 8:
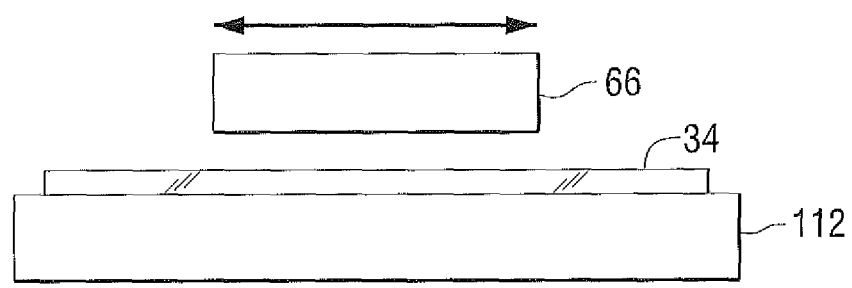
FIG. 8 is a side view of a coater and glass sheet mounted for movement relative to one another in accordance to the teachings of the invention to apply or deposit a niobium doped titania film on a substrate.

With reference to FIG. 7, in another non-limited embodiment of the invention, the TiO$_2$:Nb film 38 is applied by the spray pyrolytic coating process, e.g. as disclosed in U.S. Pat. Nos. 3,660,061; 4,111,150; 4,719,126 and 4,719,127, which patents are hereby incorporated by reference. As shown in FIG. 7, a spray pyrolysis coater 105 is mounted between exit end 106 of the glass forming chamber 58 and entrance end 107 of an annealing furnace 108. As the glass ribbon 52 is advanced by the conveyor rolls 109 in the direction of the arrow 35, the glass ribbon 52 passes under the coater 105 to deposit the TiO$_2$:Nb film on the surface 64 of the glass ribbon 52, and thereafter, the coated glass ribbon is moved by the conveyor rolls 109 into the annealing furnace 108. As can now be appreciated, the invention is not limited to placing the coater 105 at the exit end 106 of a glass forming chamber 58, and the coater for applying the TiO$_2$:Nb film can also be located at the exit end of any furnace, e.g. but not limiting to a roller hearth or an oscillating hearth, that heats glass for applying a coating, for shaping, and/or for tempering or heat strengthening the glass. Still further, with reference to FIG. 8, the invention contemplates coating the glass sheet 34 mounted on a stationary table 112 in any convenient manner, and the coater, e.g. but not limiting to the discussion the coater 66 moved over the sheet 34. The invention further contemplates securing the coater 66 in position and moving the sheet 34 on conveyor belt 116 under the coater 66. The invention also contemplates simultaneously moving the coater 66 and the glass sheet 34. Systems for moving glass sheets and/or coaters, and for maintaining coaters and/or glass sheets stationary are will known in the art and no further discussion regarding such systems is deemed necessary.

As can be appreciated by those skilled in the art, the characteristics of a pyrolytic coating are durability, surface morphology, such as smoothness, functional property such as conductivity, and optical property, such as transmission, reflection, color, and haze.

It will be readily appreciated by those skilled in the art that modifications can be made to the non-limiting embodiments of the invention without departing from the concepts disclosed in the foregoing description. Accordingly, the particular non-limiting embodiments of the invention described in detail herein are illustrative only and are not limiting to the scope of the invention, which is to be given the full breadth of the appended claims and any and all equivalents thereof.

What is claimed is:

1. A coated article comprising:
   a glass substrate having a major surface;
   a coating layer over the major surface of the substrate, wherein the coating layer is selected from the group of a color suppression layer, an anti-iridescence layer, a sodium barrier and combinations thereof, and
   a pyrolytic deposited transparent electrically conductive oxide film over the substrate, wherein the pyrolytic deposited transparent electrically conductive oxide film is a niobium doped titanium oxide film, wherein the coating layer is an intermediate coating layer and is between the substrate and the pyrolytic deposited transparent electrically conductive oxide film and the intermediate coating layer comprises a gradient layer of mixed metal oxides having different index of refraction, wherein percent of one metal oxide in the intermediate coating layer decreases as distance from the major surface of the glass substrate increases.

2. The coated article according to claim 1 wherein the glass substrate is selected from the group of a continuous glass ribbon and a glass sheet.

3. The coated article according to claim 1 wherein first surface of the intermediate coating layer is in surface contact with the major surface of the substrate and the niobium doped titanium oxide film is in surface contact with opposite second surface of the intermediate coating layer.

4. The coated article according to claim 1 wherein the niobium doped titanium oxide film has a thickness in the range of 200 nanometers ($2.0 \times 10^{-5}$ centimeters) to 2 microns ($2 \times 10^{-4}$ centimeters) and a sheet resistance greater than 1.2 ohms/square and an index of refraction of 23 or greater.

5. The coated article according to claim 1, wherein the major surface of the substrate is a first major surface of the substrate, and the substrate comprises a second major surface opposite to the first major surface, wherein the first major surface is an air side of the glass substrate and the second major surface is a tin diffused major surface, and the substrate having the air side and the tin diffused opposite side has characteristic of being made by the glass float process.

6. The coated article according to claim 1 wherein the gradient layer of the mixed metal oxides comprises a first metal oxide of silicon oxide and a second metal oxide of tin oxide, the silicon oxide having a lower index of refraction than the tin oxide and at the major surface of the substrate, percent of the silicon oxide is greater than percent of the tin oxide and the percent of silicon oxide in the intermediate layer decreases as the distance from the substrate increases, and the percent of tin oxide increases as the percent of silicon oxide decreases.

7. The coated article according to claim 1 wherein the pyrolytic deposited transparent electrically conductive niobium doped titanium oxide film is selected from the group of a chemical vapor deposited transparent electrically conductive niobium doped titanium oxide film, an atmospheric plasma deposited transparent electrically conductive niobium doped titanium oxide film, a spray pyrolysis deposited transparent electrically conductive niobium doped titanium oxide film, a plasma energy coating vapor deposited transparent electrically conductive niobium doped titanium oxide film and combinations thereof.

8. The coated article according to claim 7 wherein the pyrolytic deposited transparent electrically conductive niobium doped titanium oxide is a chemical vapor deposited transparent electrically conductive niobium doped titanium oxide film.

9. A coated article comprising:
a glass substrate having a major surface;
a coating layer over the major surface of the substrate, wherein coating layer is selected from the group of a color suppression layer, an anti-iridescence layer, a sodium barrier and combinations thereof, and
a pyrolytic deposited transparent electrically conductive oxide film over the substrate, wherein the pyrolytic deposited transparent electrically conductive oxide film is a niobium doped titanium oxide film, wherein:
the coating layer is an intermediate coating layer and is between the substrate and the pyrolytic deposited transparent electrically conductive oxide film and the intermediate layer comprises a first homogeneous metal oxide layer and a second homogenous metal oxide layer,
the first metal oxide homogeneous layer has a high index of refraction and is between the substrate and the pyrolytic film, and the second homogenous metal oxide layer has a low index of refraction and is between the first metal oxide layer and the substrate, and
the second metal oxide layer is a first silicon oxide layer and the first metal oxide layer is a first tin oxide layer and comprising a second homogenous silicon oxide layer over the first tin oxide layer and a second homogenous tin oxide layer over the second silicon oxide layer, and the pyrolytic film over the second tin oxide layer.

10. A coated article comprising:
a glass substrate having a major surface;
a coating layer over the major surface of the substrate, wherein the coating layer is selected from the group of a color suppression layer, an anti-iridescence layer, a sodium barrier and combinations thereof, and
a pyrolytic deposited transparent electrically conductive oxide file over the substrate, wherein the pyrolytic deposited transparent electrically conductive oxide film is a niobium doped titanium oxide film, and
the pyrolytic deposited transparent electrically conductive oxide film is between the substrate and the coating layer, and the coating layer comprises a gradient layer of mixed metal oxides having different index of refraction, and percent of one metal oxide in the intermediate coating layer decreases as distance from the pyrolytic deposited transparent electrically conductive oxide film increases.

11. The coated article according to claim 10 wherein the gradient layer of the mixed metal oxides comprises a first metal oxide of silicon oxide and a second metal oxide of tin oxide, the silicon oxide having a lower index of refraction than the tin oxide and at the pyrolytic deposited transparent electrically conductive oxide film, percent of the silicon oxide is greater than percent of the tin oxide and the percent of silicon oxide in the layer decreases as the distance from the pyrolytic deposited transparent electrically conductive oxide film increases, and the percent of oxide increases as the percent of silicon oxide decreases.

12. A coated article comprising:
a glass substrate having a major surface;
a coating layer over the major surface of the substrate, wherein the coating layer is selected from the group of a color suppression layer, an anti-iridescence layer, a sodium barrier and combinations thereof, and
a pyrolytic deposited transparent electrically conductive oxide film over the substrate, wherein the pyrolytic deposited transparent electrically conductive oxide film is a niobium doped titanium oxide film, and the pyrolytic deposited transparent electrically conductive oxide film is between the substrate and the coating layer,
wherein the layer comprises a first homogeneous metal oxide layer and a second homogenous metal oxide layer, and the first homogeneous metal oxide layer has a low index of refraction and is over the pyrolytic deposited transparent electrically conductive oxide film, and the second homogenous metal oxide layer has a low index of refraction and is between the first metal oxide layer and pyrolytic deposited transparent electrically conductive oxide film, and
wherein the second metal oxide layer is a first silicon oxide layer and the first metal oxide layer is a first tin oxide layer and comprising a second homogenous silicon oxide layer over the first tin oxide layer and a second homogenous tin oxide layer over the second silicon oxide layer.

* * * * *